United States Patent
Bonaddio et al.

(10) Patent No.: US 7,359,764 B2
(45) Date of Patent: Apr. 15, 2008

(54) ON-LINE/OFF-LINE SCORING BRIDGE

(75) Inventors: Robert M. Bonaddio, Ross Township, PA (US); David Gazda, Jackson Township, PA (US); Kurt Welsch, Jefferson Hills Borough, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 453 days.

(21) Appl. No.: 11/129,963

(22) Filed: May 16, 2005

(65) Prior Publication Data
US 2006/0255083 A1 Nov. 16, 2006

(51) Int. Cl.
G06F 19/00 (2006.01)
C03B 9/41 (2006.01)

(52) U.S. Cl. ............ 700/193; 700/186; 700/157; 700/158; 83/864; 83/873; 83/876; 83/883

(58) Field of Classification Search .......... 700/157–158, 700/186, 193; 83/864, 873, 876, 883, 884
See application file for complete search history.

(56) References Cited

U.S. PATENT DOCUMENTS

| | | | |
|---|---|---|---|
| 3,424,357 A | 1/1969 | Curtze et al. | 225/2 |
| 3,665,280 A * | 5/1972 | Payne et al. | 318/572 |
| 3,756,104 A | 9/1973 | Bier et al. | 83/8 |
| 3,760,997 A | 9/1973 | Bier | 225/2 |
| 3,797,339 A | 3/1974 | Pape et al. | 83/12 |
| 4,012,974 A | 3/1977 | Reinmold | 83/6 |
| 4,027,562 A | 6/1977 | Bonaddio | 83/8 |
| 4,204,445 A * | 5/1980 | Goldinger | 83/880 |
| 4,604,934 A * | 8/1986 | Elliott et al. | 83/550 |
| 4,996,898 A * | 3/1991 | Miller et al. | 83/13 |
| 5,030,592 A | 7/1991 | Komarneni et al. | 501/9 |
| 5,054,355 A * | 10/1991 | Tisse et al. | 83/879 |
| 5,240,886 A | 8/1993 | Gulotta et al. | 501/70 |
| 5,364,685 A | 11/1994 | Nakashima et al. | 428/155 |
| 5,523,162 A | 6/1996 | Franz et al. | 428/421 |
| 5,593,929 A | 1/1997 | Krumwiede et al. | 501/70 |
| 5,791,971 A | 8/1998 | Dickinson et al. | 451/11 |
| 6,027,766 A | 2/2000 | Greenberg et al. | 427/226 |
| 6,298,278 B1 * | 10/2001 | Pierse | 700/174 |
| 2004/0154456 A1 * | 8/2004 | Wakayama et al. | 83/880 |

FOREIGN PATENT DOCUMENTS

| | | |
|---|---|---|
| EP | 0 100 277 | 2/1984 |
| FR | 2 194 661 | 3/1974 |

* cited by examiner

Primary Examiner—Ronald Hartman, Jr.
(74) Attorney, Agent, or Firm—Andrew C. Siminerio

(57) ABSTRACT

A scoring bridge includes a plurality of moveable mounted carriages. The carriages each have a rotor, and the bridge has a linear stator to move the carriages. The position of a carriage designated as a reference carriage is recorded as it moves past a motion detector. The position of each remaining carriages is recorded as they individually move past the detector. The difference between the position of a carriage and the position of the reference carriage is an offset that is added to the position reading of the carriage to accurately space the carriage form the reference carriage. Each of the carriages can have a scoring assembly that includes servomotor acting through a gear arrangement on a scoring wheel. The servomotor applies a constant load to the scoring wheel and adjusts the load for any positive or negative displacement of the scoring wheel from a reference position.

19 Claims, 6 Drawing Sheets

ON-LINE/OFF-LINE SCORING BRIDGE

BACKGROUND OF THE INVENTION

1. Field of the Invention

This invention relates to an on-line/off-line scoring bridge, and more particularly, to an on-line slit scoring bridge having one or more carriages each having a scoring wheel assembly having a load applying arrangement that applies a constant load to a scoring wheel, and a system to accurately position the carriages on the bridge to reduce spacing error between adjacent carriages on the bridge.

2. Discussion of the Available Technology

On-line slit scoring bridges are used in the glass industry to impose a score or score line in the surface of a glass ribbon parallel to its path of travel as the ribbon moves past a predetermined position downstream of the exit end of the glass annealing lehr. On-line cross scoring bridges are also used to impose a score in the surface of the ribbon transverse to its path of travel. Thereafter the scores are opened to provide glass sheets of a predetermined size. The on-line slit scoring bridges usually have a plurality of spaced carriages each having a scoring wheel set in a predetermined spaced relationship to one another.

Off-line scoring bridges are mounted over a table and usually include a bridge or a carriage having a scoring wheel moveable in the X direction, and the carriage having the scoring wheel or the bridge, respectively moveable in the y direction.

For a more detailed discussion of on-line/off-line scoring bridges, reference can be made to U.S. Pat. Nos. 3,797,339; 4,012,974; 4,204,445 and 5,791,971. The disclosure of the patents is hereby incorporated by reference.

Although the presently available scoring bridges are acceptable, they have limitations. More particularly, the automatic positioning systems and techniques for spacing the carriages relative to one another do not meet current specified tolerances. For example using the presently available technology, an acceptable tolerance between adjacent spaced score lines imposed in the glass ribbon and sheet is ±0.025 inch (0.64 millimeter ("mm")). As can be appreciated by those skilled in the art, the smaller the difference between the actual dimensions of the cut glass sheet and the desired dimensions of the glass sheet to be used, the less seaming and/or grinding of the glass that is required. Further as can be appreciated by those skilled in the art, reducing the amount of glass that has to be removed, reduces the cost of the glass sheet to be used.

In addition to reducing the tolerance range between adjacent scores imposed in the glass ribbon and sheet, it is appreciated by those skilled in the art that a uniform load should be applied to the scoring wheel to provide scores of uniform depth for ease of opening the scores, and to reduce surface damage to the glass. Variations in load applied to the scoring wheel can result from contours of the glass surface, eccentric conveyor rolls, and/or variations in glass thickness, which raise and lower the scoring wheel, resulting in increased and reduced loads, respectively, on the scoring wheel.

U.S. Pat. No. 4,204,445 discloses a scoring device having a scoring head assembly and a carriage each pivotally mounted about an axis. The carriage has a pair of spaced wheels biased toward a glass ribbon and a support member. The support member biases a scoring force against the scoring head assembly to score the glass ribbon. Irregularities in the glass ribbon thickness and/or eccentric conveyor rolls oscillate the carriage and scoring head assembly about the axis. Oscillatory movement of the carriage and scoring head assembly cooperate to maintain a constant scoring force on the scoring head assembly. Although the scoring device of U.S. Pat. No. 4,204,445 is acceptable, there are limitations. In particular, the scoring device has a large number of moving parts, which makes the scoring device of the patent expensive to construct and maintain.

For additional discussions of glass scoring devices, reference can be made to U.S. Pat. Nos. 3,756,104; 3,760,997 and 4,027,562.

As is appreciated by those skilled in the art, it would be advantages to provide an on-line/off-line scoring bridge that has a system to accurately determine the position of and/or to accurately position the carriages on the bridge to reduce the spacing error between scoring wheels of adjacent carriages on the bridge thereby reducing the tolerance range between adjacent score lines imposed on the glass ribbon by the scoring wheels. It would also be advantageous to provide a load applying device that has a minimum number of moving parts and maintains a constant scoring force on the scoring wheel as the scoring wheel reciprocates along a path toward and away from the surface of the glass ribbon or glass sheet to be scored.

SUMMARY OF THE INVENTION

This invention relates to a system for positioning a plurality of carriages in spaced relationship to one another on an elongated member, e.g. a bridge. In one non-limiting embodiment of the invention the system includes a first drive arrangement acting a first carriage to move the first carriage along a first reciprocating path; a second drive arrangement acting on a second carriage to move the second carriage along a second reciprocating path; a first position measuring device for measuring positions of the first carriage along the first reciprocating path and for generating a first position signal indicating position of the first carriage on the first reciprocating path; a second position measuring device for measuring positions of the second carriage along the second reciprocating path and for generating a second position signal indicating position of the second carriage on the second reciprocating path, and a motion detector positioned relative to the first and second reciprocating paths to generate a first reference signal as the first carriage moves past the detector and to generate a second reference signal as the second carriage moves past the detector. Electronics are provided for receiving the first and second position signals and the first and second reference signals; acting on the first position signal and first reference signal to provide a first carriage reference position; acting on the second position signal and second reference signal to provide a second carriage reference position; comparing the second carriage reference position signal to the first carriage reference position to determine the difference there between defined as an offset, wherein the offset is selected from a plus value, a negative value or zero difference; and acting on the second drive arrangement to position the second carriage in a predetermined position on the second reciprocating path relative to the first carriage, wherein the second predetermined position is the position of the second carriage indicated by the second position signal plus the offset.

Another non-limiting embodiment of the positioning system of the invention includes a surface for supporting an article; an elongated member having a first end and a second end, the member mounted over and in spaced relation to the surface, wherein the first and second reciprocating paths are between the ends of the elongated member; a track mounted on the elongated member with the first and second carriages mounted on the track; and a functional device mounted on each of the carriages to act on at least one surface of the article, e.g. a device selected from the group of a scoring device, a cutting device, a marking device, a measuring device, a bar card reading device, a coating device, a recording device, a camera, and a projector.

In another non-limiting embodiment of the positioning system of the invention, the detector is a device for measuring intensity of visible light, and optionally includes a light source directing light beams transverse to the reciprocating paths toward the detector, which beams are interrupted by the carriages as they move past the detector.

The invention also related to a glass scoring device. A non-limiting embodiment of the scoring device of the invention includes a support plate; a gearbox mounted on a first surface of the support, the gearbox having an axis rotatable in a clockwise and counter clockwise direction; an elongated arm member having one end connected to the axis of the gearbox and an opposite second end; a scoring wheel mounted to the second end of the elongated member, and a servomotor acting on the gearbox to rotate the axis of the gearbox and the elongated arm member.

Another non-limiting embodiment of the glass scoring device of the invention includes a housing pivotally mounted on the second end of the elongated arm member spaced from the scoring wheel, the housing including a horizontal plate having at least one vertical member extending there from with a reference wheel mounted spaced from the vertical member, and a biasing member on the second end of the elongated member and acting on the housing to bias the housing away from the second end of the elongated member.

A further non-limiting embodiment of the glass-scoring device includes a scoring bridge mounted over and in spaced relation to a surface for supporting a glass article selected from a glass sheet and a glass ribbon; a track having an upper edge and a lower edge mounted on the bridge; and a pair of spaced upper wheels and a pair of spaced lower wheels rotatively mounted on the support plate with the upper pair of wheels riding on the upper edge of the track and the lower pair of wheels captured on the lower edge of the track. The lower pair of wheels is rotatively mounted to the support plate and the upper pair of wheels is mounted to a plate mounted in a cut out portion of the support plate that is biased to rotate the plate and wheels in a clockwise direction and a counter clockwise direction about a pivot point.

The invention still further relates to a method of positioning a pair of carriages in spaced relationship to one another on a bridge. One non-limiting embodiment of the method includes moving a first carriage from a first end of the bridge to a second opposite end of the bridge past a motion detector mounted at a predetermined position on the bridge between the ends of the bridge; recording position of the first carriage as it moves past the motion detector to provide a first position reading; moving a second carriage from the first end of the bridge to the second end of the bridge past the motion detector; recording position of the second carriage as it moves past the motion detector to provide a second position reading; comparing the second position reading to the first position reading and recording a difference, wherein the difference is an offset selected from a plus value, a minus value or zero difference; moving the first carriage to a first working position on the bridge; identifying a second working position on the bridge for the second carriage; moving the second carriage toward it's the second working position and monitoring the position of the second carriage on the bridge as it moves toward it's the second working position, and positioning the second carriage at the second working position, wherein the second working position of the second carriage is the measured position plus the offset.

DETAILED DESCRIPTION OF THE INVENTION

Figure 1:
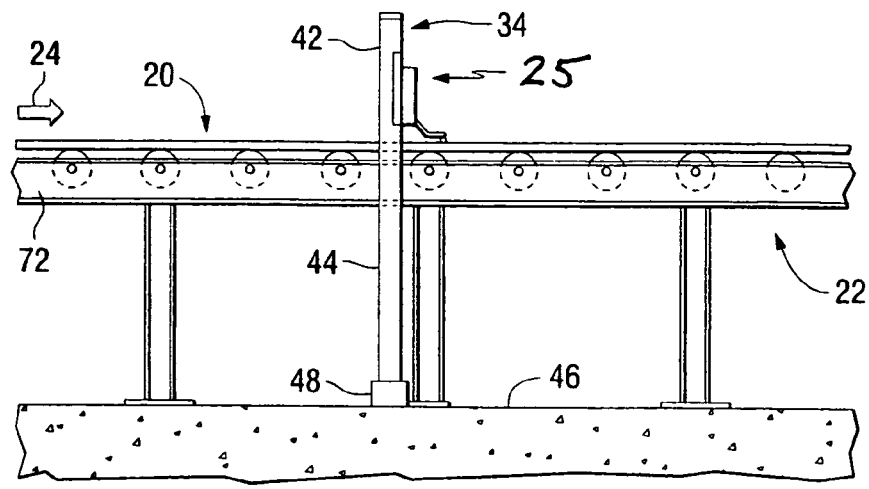
FIG. 1 is a side view of a scoring station or position for scoring a glass ribbon having an on-line scoring bridge incorporating features of the present invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Non-limiting embodiments of the invention are discussed for use on an on-line slit scoring bridge. However, as is appreciate, the invention is not limited thereto and the invention can be practiced on on-line cross scoring bridges and off-line scoring bridges, e.g. but not limiting the invention thereto, tables having carriages and/or bridges moveable in the X-Y direction. Further, the discussion includes, but is not limited to (1) carriages moveably mounted on a bridge, (2) a drive arrangement to move carriages along a bridge, (3) a scoring wheel assembly, (4) a positioning system and/or technique for positioning carriages and/or scoring wheels on a bridge in spaced relationship to one another, and (5) operation of a non-limiting embodiment of the invention.

(1) Discussion of the Carriages Moveably Mounted on a Bridge

In the following discussion, the carriages are used to move a scoring assembly along a bridge to score a glass substrate, e.g. but not limiting to the invention, a continuous glass ribbon. However as is appreciated by those skilled in the art, the present invention is not limited thereto and the invention can be practiced to score substrates made of other material, e.g. wood, metal and plastic. Further, as is appreciated by those skilled in the art, the invention is not limited to the composition of the glass ribbon to be scored. For example and not limiting to the invention, the glass ribbon can be clear or tinted soda-lime-silicate glass, borosilicate glass, or any type of refractory glass, for example, of the type disclosed in U.S. Pat. Nos. 5,030,592; 5,240;886, and 5,593,929, which patents are hereby incorporated by reference. Still further, one or both of the major surfaces of the glass ribbon can have a coating, e.g. but not limiting to the invention, a self cleaning coating, e.g. of the type disclosed in U.S. Pat. No. 6,027,766 and/or sold by PPG Industries, Inc., Pittsburgh, Pa. under their trademark "SunClean"; a hydrophobic coating of the type disclosed in U.S. Pat. No. 5,523,162 and/or sold by PPG Industries, Inc. under the trademark AQUAPEL; an electrically heatable coating or a solar control coating of the type used in the art, e.g. of the types disclosed in U.S. Pat. No. 5,364,685. U.S. Pat. Nos. 5,364,685; 5,523,162 and 6,027,766 are hereby incorporated by reference.

Figure 2:
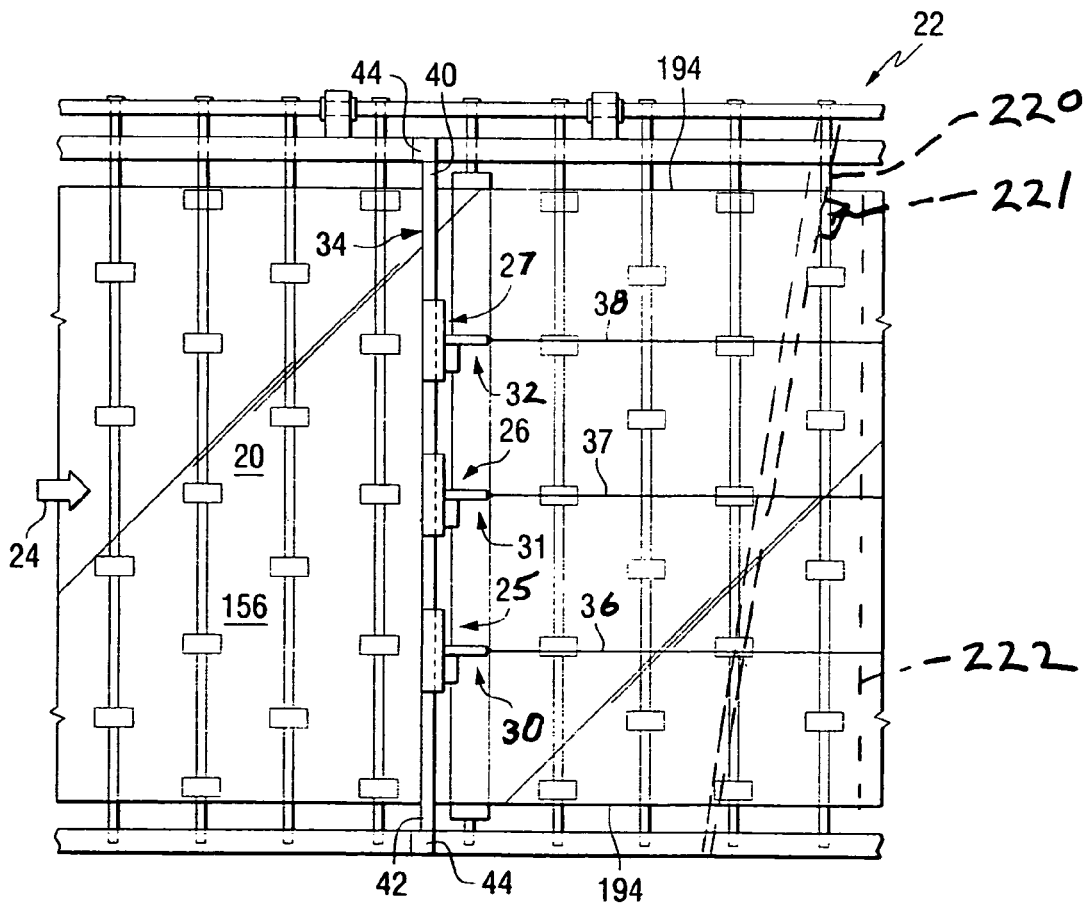
FIG. 2 is a plan view of the scoring station shown in FIG. 1.

With reference to FIGS. 1 and 2, a glass ribbon 20 is advanced by conveyor 22 in the direction of arrow 24 past a plurality of carriages 25, 26, and 27 having scoring wheel assemblies 30, 31 and 32, respectively (shown in FIG. 2). The carriages 25-27 are moveably mounted on a bridge 34 in a manner discussed below such that each of the scoring wheel assemblies 30-32 imposes a score or score line 36, 37 and 38, respectively (shown in FIG. 2), in the glass ribbon 20 in a manner discussed below having a desired spaced distance between the score lines, e.g. between adjacent score lines 36 and 37; between adjacent score lines 37 and 38, and between score lines 36 and 38 as the ribbon moves downstream of the bridge 34.

Figure 3:
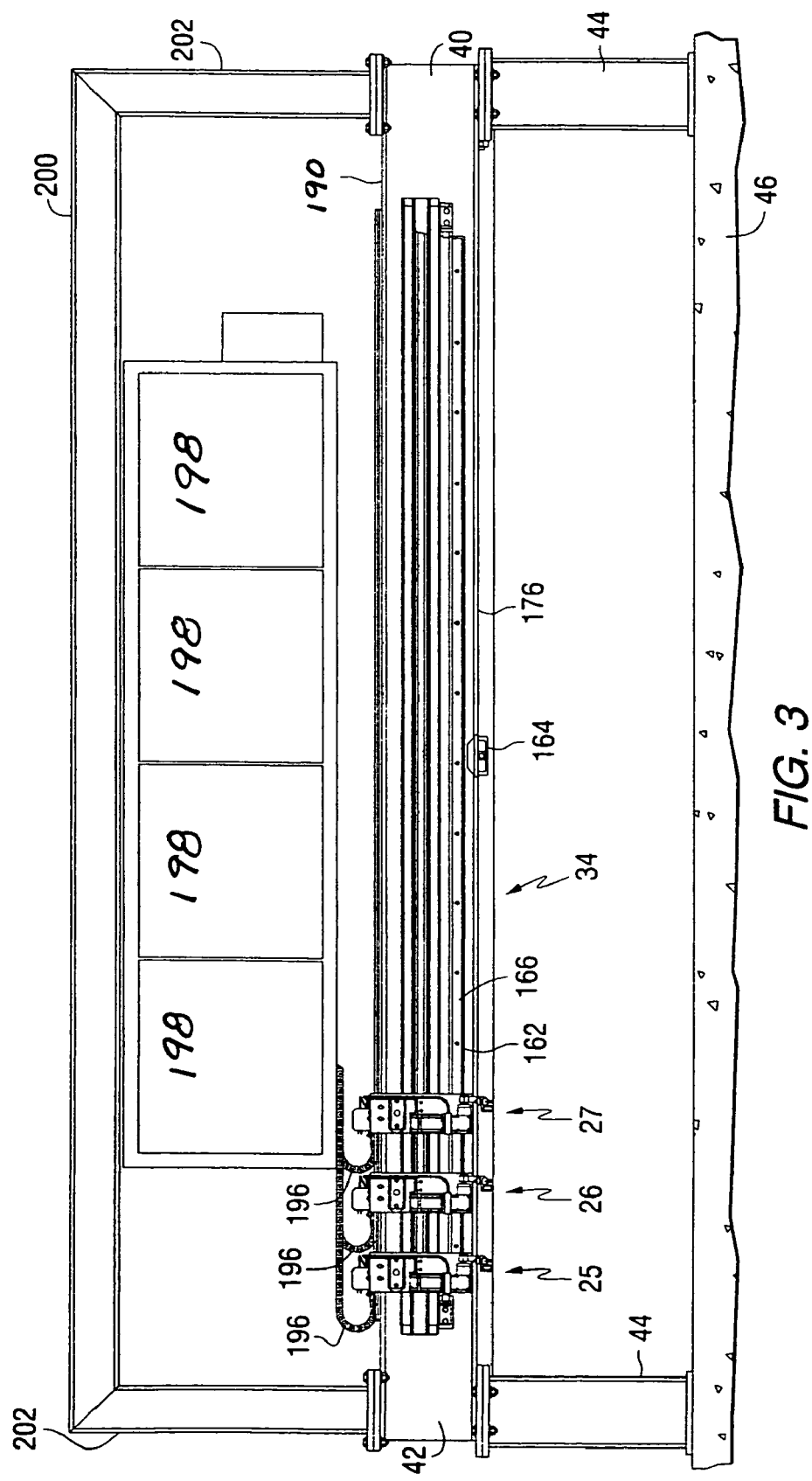
FIG. 3 is a front view of the scoring station shown in FIG. 1 with the carriages to one side of the bridge and the conveyor not shown for purposes of clarity.

The bridge 34 is mounted over conveyor 22 in any convenient manner, e.g. opposite end portions 40 and 42 of the bridge 34 are each mounted on a post 44 secured to floor 46 as shown in FIG. 3. Although the invention contemplates mounting the posts 44 to the floor, the posts can be mounted to the conveyor 22 as shown in U.S. Pat. No. 4,204,445, which patent is hereby incorporated by reference. Further and not limiting to the invention, in the instance when floor vibrations are expected that can vibrate the bridge and the carriages, the posts 44 can be mounted on air or spring anti-vibration mounts 48 (only one shown in FIG. 1) to minimize, if not eliminate transmitting vibrations from the floor 46 to the bridge 34.

As is appreciated by those skilled in the art, one or more bridges can be mounted over the conveyor 22. Further, the present invention is not limited to the conveyor 22 shown in FIGS. 1 and 2, and any type of conveyor used in the art for moving objects can be used in the practice of the invention to advance a glass ribbon under the slit scoring bridge 34. Because conveyors for advancing glass, e.g. a glass ribbon or glass sheets are well known in the art and are not limiting to the invention, no further discussion regarding conveyors is deemed necessary.

The carriages 25-27 are identical in construction, and the following discussion directed to the carriage 25 is applicable to the carriages 26 and 27 unless indicated otherwise.

Figure 4:
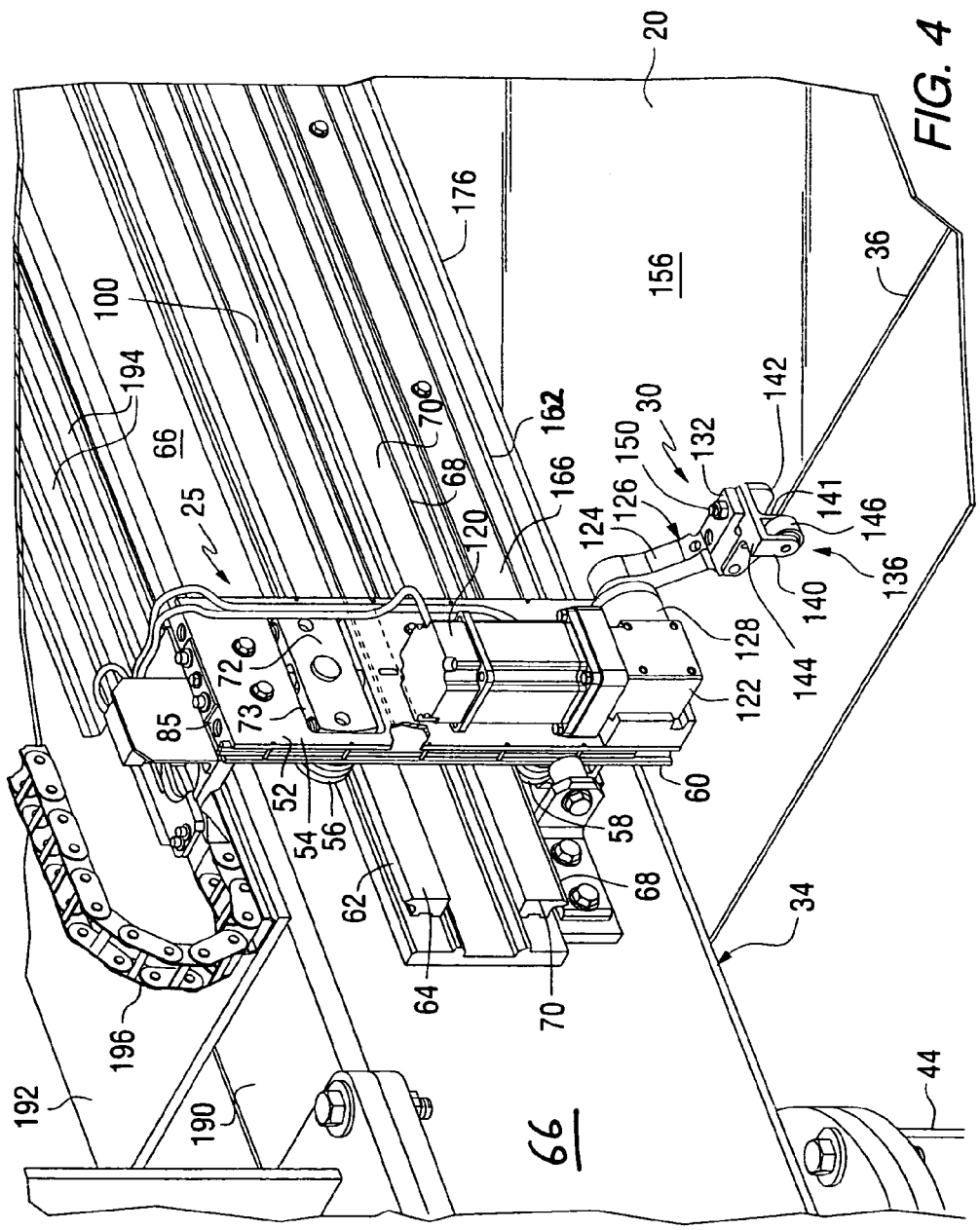
FIG. 4 is a partial orthogonal view of the left side of the bridge as viewed in FIG. 3 showing details of the left side of one of the carriages incorporating features of the present invention.
Figure 5:
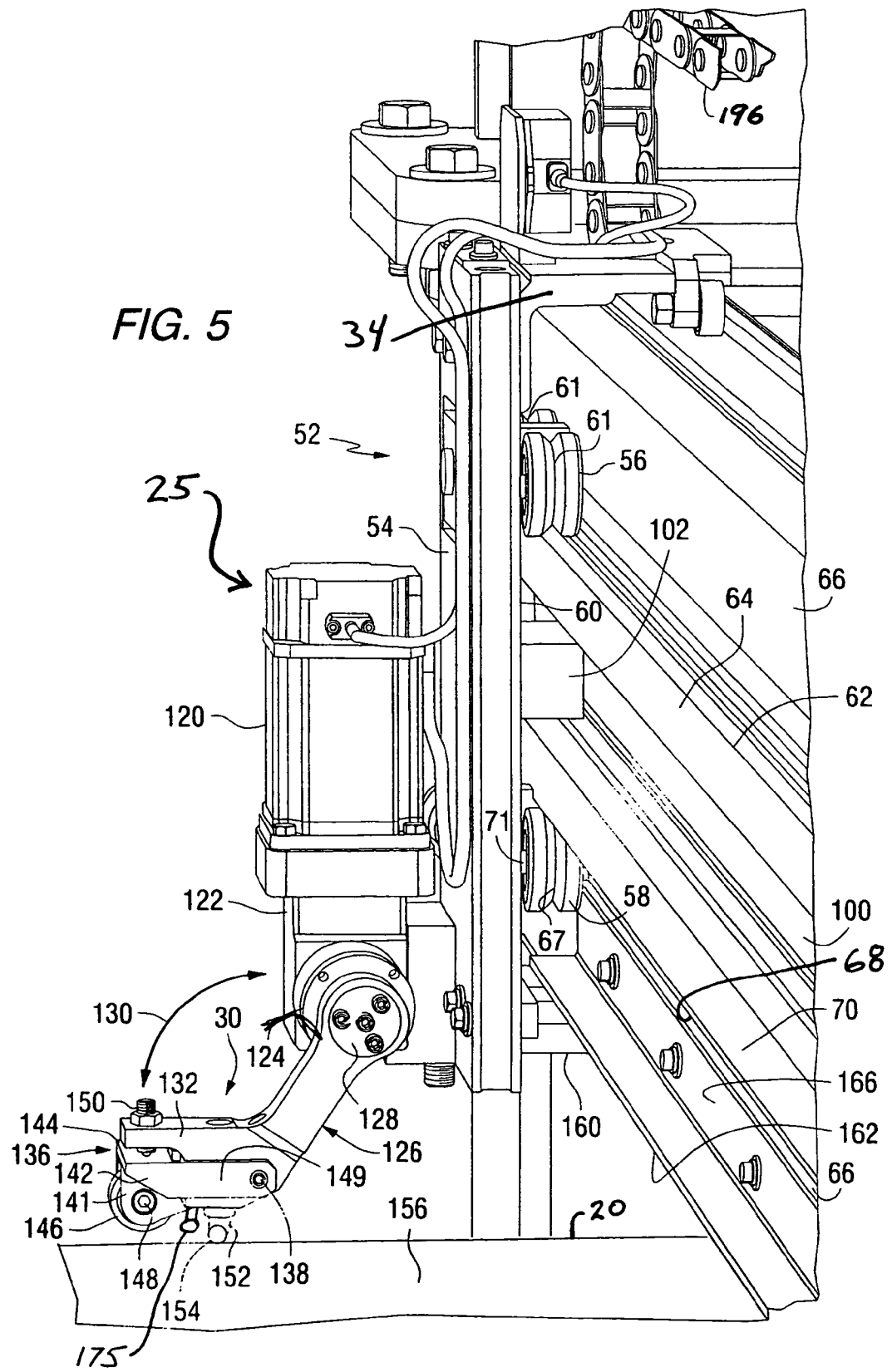
FIG. 5 is a partial orthogonal view of the left side of the bridge as viewed in FIG. 3 showing details of the right side of the carriage shown in FIG. 4.

With reference to FIGS. 3-5, and more particularly to FIGS. 4 and 5, the carriage 25 includes a plate member 52 having the scoring wheel assembly 30 mounted on major surface 54, e.g. front major surface 54, and a pair of upper grooved wheels 56, and a pair of lower grooved wheels 58 (only one upper wheel and one lower wheel clearly shown in FIG. 4 and the other upper wheel and lower wheel shown in FIG. 5), rotatively mounted on the plate member 52. Peripheral groove 61 of each of the upper wheels 56 (see FIG. 5) rides on upper edge 62 of upper track 64 mounted on surface 66 of the bridge 34, and peripheral groove 67 of each of the lower wheels 58 (only one groove shown in FIG. 5) rides on lower edge 68 of lower track 70 mounted on the surface 66 of the bridge 34, spaced from the upper track 64.

The upper wheels and the lower wheels can be rotatively mounted on the plate member 52 in any convenient manner. For example, and not limiting to the invention, with reference to FIG. 5, each of the lower wheels 58 (only one shown in FIG. 5) is rotatively mounted to one end of shaft 71 with the other end of the shaft 71 securely mounted to back major surface 60 of the plate member 52. The upper wheels 56 can be rotatively mounted to the back surface 60 of the plate member 52 in a similar manner as the lower wheels 58; however, in one non-limiting embodiment of the invention, a biasing force is applied to each of the upper wheels 56 such that the upper wheels pivot about a common point to compensate for variations in the distance between the upper edge 62 of the upper track 64 and the lower edge 68 of the lower track 70 along the length of the spaced tracks and/or to compensate for wear of the edges 62 and 68 of the tracks 64 and 70, respectively. In this manner, the centerline of the carriage is maintained in a vertical plane generally normal to the plane of the path of travel designated by the number 24 (see FIGS. 1 and 2).

Figure 6:
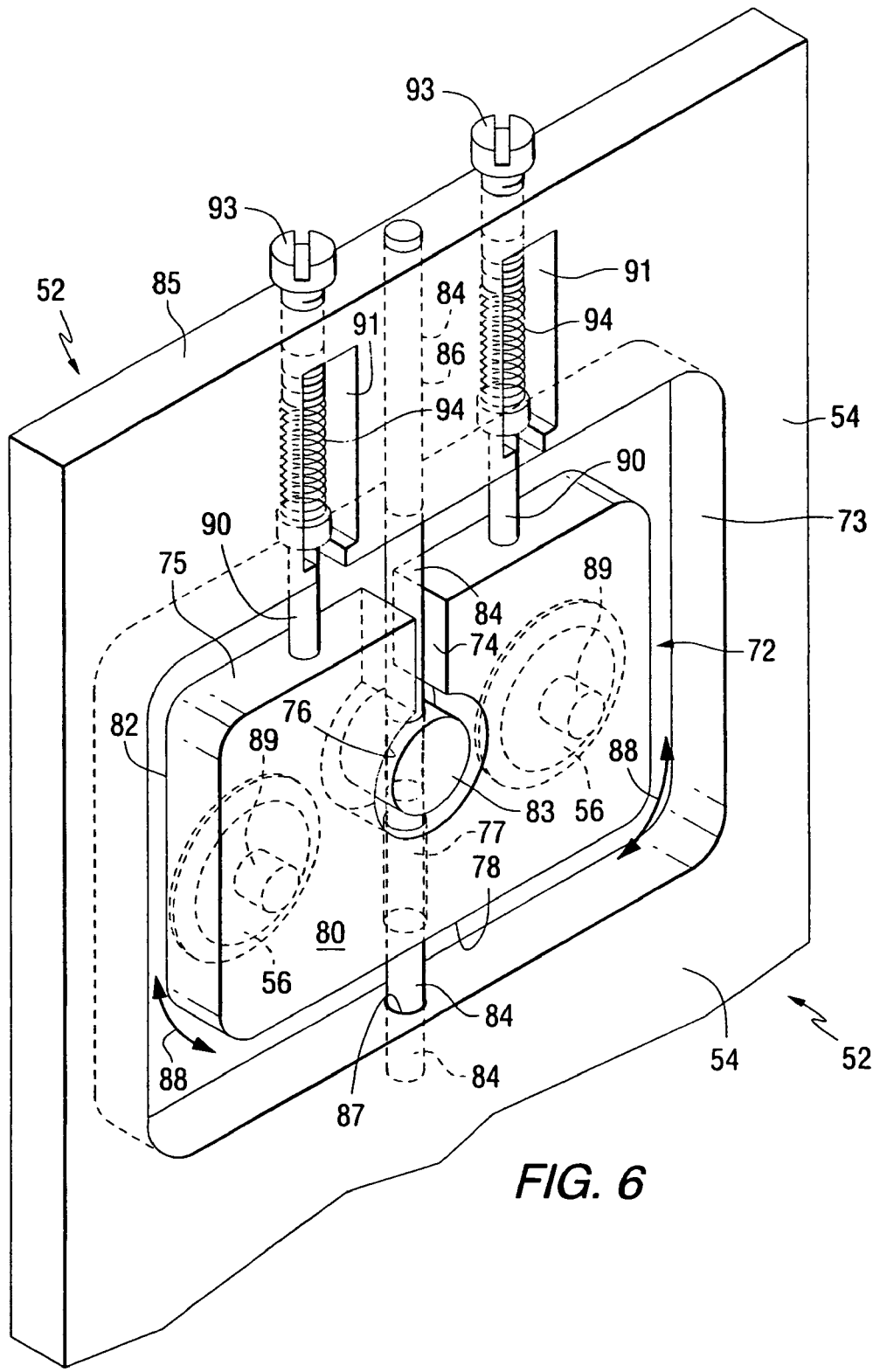
FIG. 6 is a fragmented orthogonal view having portions removed and in cross section for purposes of clarity of the mounting-arrangement for the upper pair of wheels of a carriage, incorporating features of the present invention.

The invention is not limited to the assembly used to pivotally mount the upper wheels 56 to the plate member 52. For example, with reference to FIGS. 4 and 6, and not limiting to the invention, an insert 72 is pivotally mounted in any convenient manner in hole 73 in the plate member 52. For example and not limiting to the invention, the insert 72 has an upper passageway 74 extending from upper side 75 of the insert 72 to circular center hole 76, and a lower passageway 77 extending from lower side 78 to the center hole 76. The center hole 76 extends from the front major surface 80 to back major surface 82 of the insert 72 to receive a disc 83. A stem 84 as shown in FIG. 6 extends from upper side or upper end portion 85 of the plate member 52 through passageway 86 of the plate member, through the upper passageway 74 of the insert 72, through the disc 83, through the lower passageway 77 of the insert 72 with the end of the stem 84 secured in hole 87 of the plate member 52. The hole 76 of the insert 72 and the periphery of the disc 83, and the passageways 74 and 77 are sized such that the insert can rotate about the disc along reciprocating paths 88. The upper wheels 56 are rotatively mount to a shaft 89 mounted to back major surface 82 of the insert 72 on each side of the disc 83 as shown in FIG. 6.

With continued reference to FIG. 6, a biasing arrangement acts on the insert 72 to bias the pair of the upper wheels 56 toward the upper track 64. In one nonlimiting embodiment of the invention, the biasing arrangement includes a headed pin 90 slidably mounted and captured in passageway 91 formed in the upper portion of the plate member 52. Pin 90 is biased toward and against the insert 72 by threaded shaft or screw 93 acting on spring 94, which acts on the pin 90. A similar arrangement is provided on the other side of the stem 84. Rotating the screws 93 adjusts the biasing force acting on their respective on of the pins 90, which act on the insert 72 to bias the pair of the upper wheels 56 toward the upper track 64.

As can be appreciated the invention is not limited to the arrangement to secure the plate member 52 of the carriage 25 on the bridge 34 for reciprocal movement along the tracks 64 and 70 between ends 40 an 42 of the bridge 34 (see FIG. 3), e.g. the arrangement disclosed in U.S. Pat. Nos. 3,797,339; 4;012,974, and 4,204,445 can be used in the practice of the invention. The disclosures of U.S. Pat. Nos. 3,797,339; 4,012,974, and 4,204,445 are hereby incorporated by reference.

As is now appreciated, the non-limiting embodiments of the carriages of the invention are not limited to moving scoring assemblies across a conveyor; more particularly, the carriages of the invention can be used to move inspection devices, coating nozzles, cutting devices, surface marking devices, bar code readers, among other things along a bridge mounted over a table or conveyor. Further the carriages having features of the invention can be used on the bridge and with the scoring assembly disclosed in U.S. Pat. No. 4,204,445, which patent is hereby incorporated by reference.

(2) Discussion of a Drive Arrangement to Move Carriages Along the Bridge

With reference to FIGS. 4 and 5, the carriage 25 is powered by a linear stator 100 mounted on the surface 66 of the bridge 34 between the upper and lower tracks 64 and 70, respectively, and a rotor 102 (clearly shown in FIG. 5) mounted on the back major surface 60 of the plate member 52 of the carriage 25 between the upper and lower wheels, 56 and 58, respectively, in facing relationship to the linear stator 100. In one non-limiting embodiment of the invention the linear motor is of the type sold by Yaskawa Corp. type SGLFW. Because detailed information regarding the operation of linear stator 100 and rotor 102 is available from suppliers of such equipment, e.g. Yaskawa Corp., no detailed discussion regarding the operation of the stator 100 and the rotor 102 is deemed necessary.

As can be appreciated, the invention is not limited to any particular drive arrangement, and any of the drive arrangements used in the art can be used to move the carriages along the bridge. Further as can be appreciated, the drive arrangement of the invention is not limited to moving carriages having a scoring assembly along a bridge, and the carriage drive arrangement of the invention can be used to move a carriage along a bridge having any type of equipment that acts on the surface of an article, e.g. but not limiting the invention thereto inspection devices, cutting devices, coating nozzles, surface marking devices, bar code readers, among other things.

(3) Discussion of a Scoring Wheel Assembly Capable of Applying a Torque Under a Constant Force to a Scoring Wheel With reference to FIGS. 4 and 5. the scoring assembly 30 of the carriage 25 is mounted on front major surface 54 of the plate member 52 and includes a servomotor 120 connected to and acting on angle gear box 122. End portion 124 of angled arm 126 is mounted to shaft 128 extending out of the gear box 122. The servo motor 120 rotating the shaft 128 in a clockwise direction along the reciprocating path 130 (shown in FIG. 5) moves end portion 132 of the arm 126 in a clockwise direction away from the conveyor 22 and the glass ribbon 20 supported on the conveyor 22, and the servo motor 120 rotating the shaft 128 in a counterclockwise direction along the reciprocating path 130 moves the end portion 132 of the arm 126 in a counterclockwise direction toward the conveyor 22 and the glass ribbon 20 supported on the conveyor 22.

Figure 7:
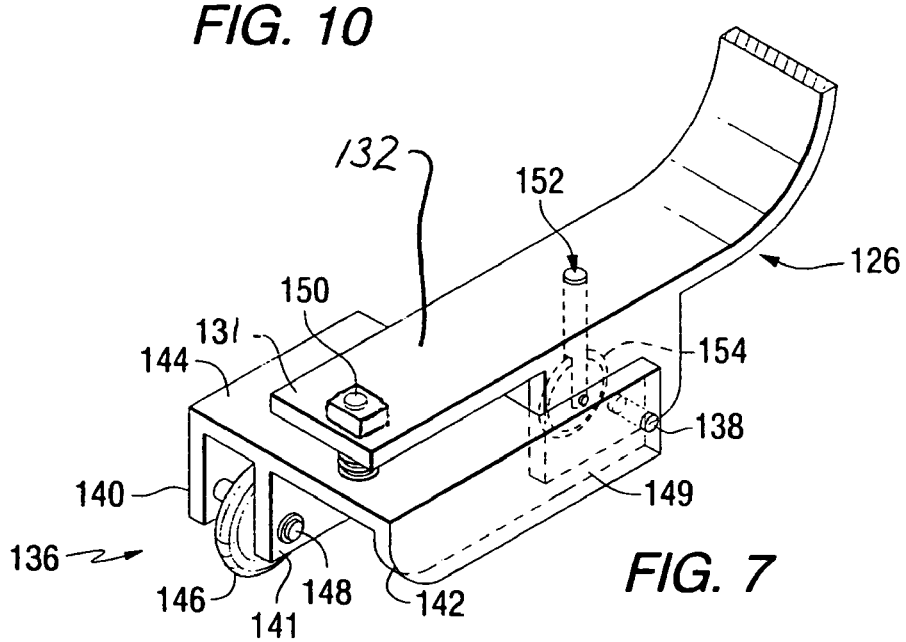
FIG. 7 is a fragmented orthogonal view of a wheel housing, mounted on end portion of an arm of a scoring wheel assembly, incorporating features of the invention.

With reference to FIGS. 4, 5 and 7, and particularly to FIG. 7, the end portion 132 of the arm 126 has a wheel housing 136 pivotally mounted at 138. The wheel housing 136 includes spaced walls 140, 141 and 142 extending from support plate member 144. A reference wheel 146 is rotatively mounted between the walls 140 and 141 on shaft 148 having end portions mounted to the walls 140 and 141. End portion 149 of the wall 142 is pivotally mounted at the pivot point 138 to the arm 126. A biasing member, such as but not limited to a spring plunger 150, biases the wheel housing 136 toward the conveyor 22 and the glass ribbon 20 supported thereon (see FIGS. 1 and 2). A pillar post 152 having scoring wheel 154 is mounted on the arm 126 of the scoring wheel assembly 30 adjacent to the pivot point 138 as shown in FIG. 7.

Figure 8:
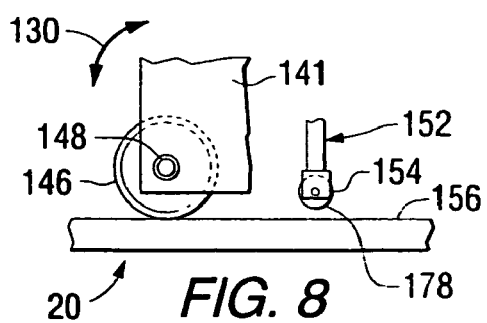
FIG. 8 is a fragmented side view of the wheel housing of FIG. 7 showing the reference wheel and scoring wheel in the non-scoring position in accordance to the teachings of the present invention.
Figure 9:
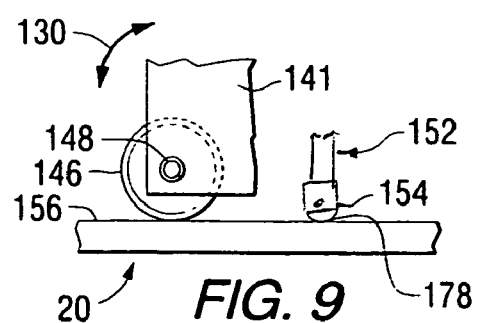
FIG. 9 is a view similar to view of FIG. 8 showing the reference wheel and the scoring wheel in the scoring position.

With the spring plunger 150 in its extended position, the servomotor 120 can rotate the end portion 132 of the arm 126 in a counterclockwise direction such that the reference wheel 146 is positioned on surface 156 of the glass ribbon 20 and the scoring wheel 154 is spaced above the glass ribbon surface 156 as shown in FIG. 8. This positioning of the reference wheel 146 and the scoring wheel 154 are referred to as the non-scoring position. Energizing the servomotor 120 to continue moving the arm 126 in the counterclockwise direction moves the support plate 144 against the biasing action of the spring plunger 150 to pivot the wheel housing 136 in a clockwise direction about the pivot point 138 and press the reference wheel 146 against the glass ribbon surface 156. The pressure on reference wheel 146 is provided by the spring plunger 150. Further continues counterclockwise movement of end portion 132 of arm 126 will apply additional pressure to reference wheel 146 and will move scoring wheel 154 against the glass ribbon surface 156 as shown in FIG. 9, i.e. the scoring wheel 154 and the reference wheel 146 are moved into the scoring position to score the glass ribbon surface 156. After the scoring of the glass ribbon surface 156 is completed, the servomotor 120 moves the end portion 132 of the arm 126 in a clockwise direction to move the reference wheel 146 and the scoring wheel 154 into the non-scoring position. As the arm 126 rotates clockwise, the spring plunger 150 pivots the wheel housing 136 in a counterclockwise direction. In the instance when the carriage 25 is to be moved to a different position on the bridge 34, the servomotor 120 moves the end portion 132 of the arm 126 in the clockwise direction to move the reference wheel 146 out of contact with the glass ribbon surface 156, i.e. moves the reference wheel and scoring wheel to a storage position.

Although in the practice of the invention, it is preferred to use the reference wheel to position the scoring wheel 154 in the non-scoring position, the invention is not limited thereto and the invention contemplates a scoring assembly without the wheel housing 136 and/or without the reference wheel 146. In an arrangement without the wheel housing 136 and/or without the reference wheel 146, the arm 126 moving in the counterclockwise direction moves the scoring wheel 154 against the glass surface 156, and the arm 126 moving in the clockwise direction moves the scoring wheel 154 away from the glass surface 156 into the non-scoring position.

The servomotor 120 applies a torque on the shaft 128 of the angle gearbox 122 to rotate the arm 126 in the counterclockwise or clockwise direction. The torque applied when the arm 126 of the scoring assembly 30 is in the non-scoring position (see FIG. 8) is sufficient to overcome the biasing action of the spring plunger 150 to maintain the reference wheel 146 against the surface 156 of the glass ribbon 20 but insufficient to move the scoring wheel 154 into contact with the surface 156 of the glass ribbon. When the glass ribbon surface 156 is to be scored, the servomotor 120 applies a load to the arm 126 to overcome the biasing action of the spring plunger 150 to bias the scoring wheel 154 against the glass ribbon surface 156 as shown in FIG. 9 under a predetermined load to impose a score in the glass surface 156. When the servomotor 120 senses a reduction of torque force on the scoring wheel 154, e.g. due to a downward movement of the glass ribbon surface 156, the servomotor 120 increases the load on the arm 126 to maintain a constant torque force or constant scoring load on the scoring wheel 154. When the servomotor senses an increase of torque force on the scoring wheel 154, e.g. due to upward movement of the glass ribbon surface 156, the servomotor 120 decreases the load on the arm 126 to maintain a constant torque force or scoring load on the scoring wheel 154. Stated another way, the servomotor applies a constant load to the scoring wheel and adjusts the load for any positive or upward displacement, or negative or downward displacement of the scoring wheel from a reference position. Up and down movement or displacement of the glass ribbon surface 156 and/or the glass ribbon 20 can result from contours of the glass surface, eccentric conveyor rolls, and/or variations in glass thickness, which raise and lower the scoring wheel resulting in increased and reduced loads, respectively on the scoring wheel.

As is appreciated by those skilled in the art, the invention is not limited to the scoring load applied to the scoring wheel, e.g. scoring wheel 154 to impose a score, e.g. score 36 (see FIG. 2) in the surface 156 of the glass ribbon 20. For example, in one non-limiting embodiment of the invention, a load of 10 pounds is applied to the scoring wheel having a diameter of ½ inch and a scoring angle of 62 degrees to score a glass ribbon having a thickness of 3 millimeters. When the distance from the center of the shaft 128 of the angled gear box 122 to the center of the scoring wheel 154 is 3 inches the 10 pound load applies a torque force of 30 inch pounds (10 pounds×3 inches).

The invention is not limited to the type of servomotor 122 used to apply a constant torque to the arm 126 or a constant load to the scoring wheel 154. For example, in one non-limiting embodiment of the invention, a servomotor of the type sold by Yaskawa Corp. type SGMAH 750 watt, 200 VAC with incremental encoder and keyway part SGMAH-08AAF41 is used.

As can be appreciated, the scoring assembly of the invention can be used with any carriage design and/or drive arrangement known in the art.

(4) Discussion of a Positioning System and/or Technique for Positioning Carriages and/or Scoring Wheels on a Bridge in Spaced Relationship to One Another In general and with reference to FIGS. 3-5 and 10, the system and/or techniques for positioning the carriages 25-27 on the bridge 34 in spaced relationship to one another includes a linear encoder reading head 160 mounted on each of the carriages 25-27, a linear encoder scale 162 mounted on the bridge 34 and a motion detector 164 capable of generating signals as the carriages move past the detector. Without limiting the present invention, in one nonlimiting embodiment, the motion detector is an energy or optical measuring device 164, e.g. a device that measures ultraviolet, visible and/or infrared wavelengths. With reference to FIG. 5, the linear encoder reading head 160 is mounted on a carriage, e.g. carriage 25, e.g. but not limiting to the invention to the back surface 60 of the plate member 52 below the lower pair of wheels 58 and positioned to read the linear encoder scale 162 mounted to the surface 66 of the bridge 34 in any convenient manner, e.g. but not limiting to the invention, mounted on angle iron 166 with the scale 162 facing the conveyor 24 (conveyor clearly shown in FIGS. 1 and 2).

Figure 10:
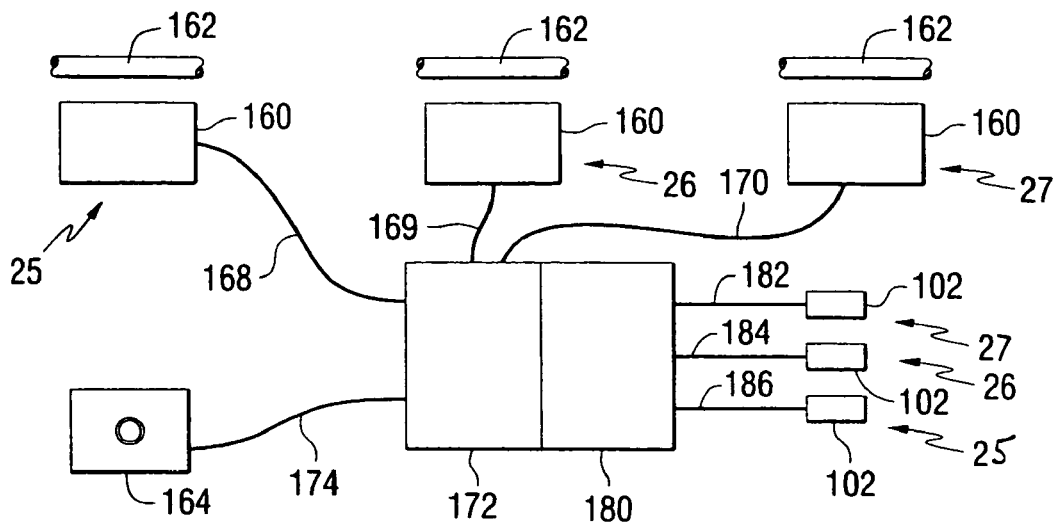
FIG. 10 is a block diagram of a non-limiting wiring arrangement and components to accurately position carriages on the bridge in spaced relationship to one another in accord with the teachings of the present invention.

With reference to FIGS. 3 and 10, as each of the carriages 25-27 moves along the bridge 34, the encoder reading head 160 of each carriage 25-27 forwards a signal along a cable, e.g. along cable 168 for carriage 25, along cable 169 for the carriage 26 and along cable 170 for the carriage 27, to a register 172 indicating the markings on the linear encoder scale 162 read by the encoder reading head 160 as the carriages 25-27 move.

The optical measuring device 164 (see FIG. 3) is mounted on the bridge 34 in any convenient manner to projected a line of sight (not shown) transverse to the path of travel of the carriages 25-27 such that as a carriage moves past the line of sight of the measuring device 164, a signal is forwarded along cable 174 to the register 172. In one non-limiting embodiment of the invention, the optical measuring device is mounted on bottom surface 176 of the bridge 34 as shown in FIG. 3, with the line of sight of the optical measuring device in the path of the pillar post 152 having the scoring wheel 154 (see FIGS. 7-9). The optical measuring device 164 senses the light in its line of sight and forwards a signal along cable 174 to the register 172 indicating the amount of light sensed by the measuring device 164. As the leading edge of the circular pillar post 152 moves into the line of sight of the measuring device 164, a portion of the light being directed toward the measuring device 164 is blocked and the signal to the register 172 along the cable 174 indicates a decrease in the amount of light sensed by the measuring device. As the trailing edge of the pillar post 152, moves past the line of sight of the measuring device 164, the measuring device forwards a signal along the cable 174 to the register indicating an increase in the amount of light sensed by the measuring device 164.

As the signals from the measuring device 164 are forwarded to the register 172 along the cable 174 indicating that the pillar post 152 of a carriage, e.g. carriage 25 is moving through the line of sight of the measuring device, the linear encoder reading head 160 of the carriage 25 is forwarding signals along the cable 168 to the register 172 indicating the reading of the linear encoder scale 162. The scoring surface or edge 178 of the scoring wheel 154 (see FIGS. 8 and 9) is generally aligned with vertical center line of the pillar post 152; therefore, the vertical center line of the pillar post is used to indicate the position of the carriage and/or scoring wheel on the carriage as the carriage moves past the measuring device 164. More particularly, the distance between the leading and trailing edges of the pillar post 152 determined by the measuring device 164 is divided by 2. The reading of the linear encoder scale 162 by the reading head 160 as the center of the pillar post 152 moves past the measuring device 164 is the measured position of the carriage used to position the carriages on the bridge in a manner discussed below.

Although not limiting to the invention, the linear encoder reading head 160 and the linear encoder scale 162 can be of the type sold by Sony Corporation as part no. PL101-R, and the optical measuring device 164 can be of the type sold by Keyence Corporation. The register 172 can be any type that registers and compares data or information, e.g. identify position of a moving object upon the occurrence of an event, e.g. but not limiting to the invention, the position of a carriage on a bridge as the pillar post of the carriage moves past a reference point.

In the practice of the invention, the optical measuring device 164 measures visible light, e.g. wavelengths in the range of the visible spectrum. A decrease in the amount of visible light sensed by the measuring device 164 indicates that an object, e.g. the pillar post 152 (see FIGS. 8 and 9) is moving through the line of sight of the measuring device. Usually the ambient light is sufficient to provide a contrast for the measuring device to sense a blockage of light; however, in the instance where the ambient light is not sufficient, an elongated light source 175 (shown only in FIG. 5), e.g. but not limiting to the invention a fluorescent light tube or light emitting diode can be mounted to end portion 132 of the arm 126 in any convenient manner or mounted on cross scoring bridge (bridge 222 shown in phantom in FIG. 2) downstream of the bridge 34.

In one non-limiting embodiment of the invention and with reference to FIG. 3, the carriages 25-27 are moved from one side of the optical measuring device 164 to the opposite side of the measuring device 164, e.g. from the end portion 42 of the bridge 34 to the end portion 40 of the bridge. As the first one of the carriages, e.g. the carriage 27 moves past the measuring device 164, the optical measuring device forwards a signal along the cable 174 to the register 172 indicting that the pillar post 152 (see FIGS. 8 and 9) of the carriage 27 is moving past the optical measuring device 94. The linear encoder reading head 160 of the carriage 27 forwards a signal along cable 170 to the register 172 (see FIG. 10). The register determines and records the positions of the carriage 27 as the pillar post moves past the measuring device 164 and forwards the information to a computer 180. The carriage 27 continues to move to a position adjacent the end portion 40 of the bridge 34.

The computer 180 acts on the information from the register 172 to determine center line position of the carriage 27. The measured position of carriage 27 as the vertical center line of the pillar post 152 of the carriage 27 moves through the line of sight of the measuring device 164 is also referred to as the "carriage 27 reference position."

The next carriage, i.e. carriage 26 moves from the end portion 42 of the bridge 34 past the optical measuring device 164 toward the end portion 40 of the bridge 34. As the pillar post 152 of the carriage 26 moves through the line of sight of the measuring device 164, the signals from the measuring device forwarded along the cable 174 to the register 172 indicate changes in the amount of light sensed by the measuring device, and the signal from the linear encoder reading head 160 of the carriage 26 forwarded along the cable 169 to the register as the pillar post of the carriage 26 moves past the measuring device 164 are recorded and the data forwarded to the computer 180. The position of the carriage 26 on the linear encoder scale 162 as the vertical centerline of the pillar post 152 of the carriage 26 moves through the line of sight of the measuring device is also referred to as the "carriage 26 position."

The next carriage, i.e. carriage 25, moves from the end portion 42 of the bridge 34 past the optical measuring device 164 toward the end portion 40 of the bridge 34. As the pillar post 152 of the carriage 25 moves through the line of sight of the measuring device 164, the signals from the measuring device forwarded along the cable 174 to the register 172 indicate changes in the amount of light sensed by the measuring device, and the signal from the linear encoder reading head 160 of the carriage 25 forwarded along the cable 170 to the register as the pillar post of the carriage 25 moves past the measuring device 164 are recorded and the data forwarded to the computer 180. The position of the carriage 25 on the linear encoder scale 162 as the vertical centerline of the pillar post 152 of the carriage 26 moves through the line of sight of the measuring device is also referred to as the "carriage 25 position."

The computer 180 determines the difference between the carriage 27 reference position and the carriage 26 position and stores the information until there is a need to set a spaced distance between the carriages 26 and 27. For example and not limiting to the invention, consider the carriage 27 reference position having a position of 97.000 inches and the carriage 26 position having a position of 97.015 inches, any spaced distance between the center line of the pillar posts of the carriages 26 and 27 should be adjusted by subtracting 0.015 inches from the position of the carriage 26 as indicated by the linear encoder reading head 160 for a more accurate spacing between the scoring wheels of the carriages 26 and 27.

Further, the computer 180 determines the difference between the carriage 27 reference position and the carriage 25 and 26 positions and stores the information until there is a need to set a spaced distance between the carriages 25 and 26, or between the carriages 25 and 27, or between the carriages 26 and 27. For example and not limiting to the invention, consider the carriage 27 reference position having a position of 97.000 inches; the carriage 26 position having a position of 97.015 inches, and the carriage 25 having a position of 96.090. Any spaced distance between the centerline of the pillar posts 154 of the carriages 25 and 27 should be adjusted by adding 0.010 inches to the position of the carriage 25 as read by the linear encoder reading head 160 for a more accurate spacing between the scoring wheels of the carriages 26 and 27. For example and not limiting to the invention, it is desired to provide score lines spaced 24 inches apart. A signal is forwarded by the computer 180 along cable 182 to the rotor 102 of the carriage 27 to position the carriage 27 on the bridge at 57.000 inches as determined by the linear encoder reading head 160 of the carriage 27; a signal is forwarded by the computer 180 along cable 184 to the rotor 102 of the carriage 26 to position the carriage 26 on the bridge at 80.985 as determined by the linear encoder reading head 160 of the carriage 26, and a signal is forwarded by the computer 180 along the cable 186 to the rotor 102 of the carriage 25 to position the carriage 25 on the bridge at 105.010 inches as determined by the linear encoder reading head 160 of the carriage 25 to more accurately space the scoring wheels 154 of the carriages 27 and 26, and 26 and 25, 24 inches apart.

Practicing the above, non-limiting embodiment of the invention, the spaced relationship of the scoring wheels 154, and/or the center line of the pillar posts 152, of the carriages to one another, e.g. carriages 25 and 26, carriages 25 and 27, and carriages 26 and 27 can be maintained to a measuring tolerance of less than plus or minus 0.025 inch (0.64 mm.), preferably less than plus or minus 0.020 inch (0.51 mm.), and more preferably equal to or less than plus or minus 0.015 inch (0.38 mm.).

Detailed information regarding the operation of linear encoder reading heads, linear encoder scales and optical measuring devices is available from suppliers of such equipment, e.g. Sony Corporation and/or Keyence Corporation as the case may be, and therefore, no detailed discussion regarding the operation of such equipment is deemed necessary. Further electronic registers, computers and software to determine and/or adjust position readings are known in the art, and detailed discussion regarding the operation of the register, computers and software is not deemed necessary.

As can be appreciated, the technique of the invention to more accurately position carriages in spaced relation to one another on a bridge is not limited to any particular carriage drive arrangement or to any the device carried by the carriage. For example, but not limiting the invention thereto, the technique of the invention can be practiced on carriages carrying any type of equipment that acts on the surface of an article, e.g. but not limiting the invention thereto inspection devices, cutting devices, coating nozzles, surface marking devices, bar code readers, among other things. Still further, the techniques of the invention can be used with any carriage drive arrangement, e.g. but not limiting to the invention, the drive arrangement disclosed in U.S. Pat. No. 3,797,339.

The invention is not limited to the manner in which the carriages 25-27 are connected to an electrical power source and control components to move and position the carriages 25-27, and operate the scoring assembly 30-32 of the carriages 25-27, respectively, as discussed above. For example, and not limiting to the invention, shown in FIG. 4, upper surface 190 of the bridge 34 is provided with plate 192 having a plurality of grooved support tray 194, each support tray having a power track 196 (see also FIG. 3). Each power track 196 carries electrical wires or cables (not shown) to interconnect one of the carriages to electrical power source and control components 198 (see FIG. 3) having the register 172 and computer 180 (see FIG. 10) to move and position the carriages and operate the scoring assembly as discussed above. In one non-limiting embodiment of the invention, the components 198 are mounted on a beam 200 mounted above the bridge 34 by posts 202 as shown in FIG. 3.

(5) Operation of a Non-Limiting Embodiment of the Invention

In the following non-limiting embodiment of the invention, three score lines 36-38 (see FIG. 2) are imposed in the surface 156 of the glass ribbon 20 with adjacent scores spaced 30 inches plus or minus 0.015 inch. The linear encoder scale 162 has a length of 180 inches with positions on the scale spaced 0.001 inches apart. The optical measuring device 164 is between the carriages and an end portion of the bridge, e.g. between the carriage 27 and the end portion 40 of the bridge 34 as shown in FIG. 3. With reference to FIGS. 5 and 10, a signal is forwarded by the computer 180 along cable 182, 184 and 186 to the rotor 102 of each of the carriages 25-27, respectively to move its respective carriage past the optical measuring device 164, e.g. as shown in FIG. 3 from the left side of the bridge 34 to the right side of the bridge. The position on the linear encoder scale 162 of each carriage 25-27 as the carriages individually move past the optical measuring device is forwarded along cables 168-170 respectively to the register 172. The signal from the measuring device 164 that the pillar post 152 of a carriage is moving through the line of sight of the measuring device is forwarded along cable 174 to the register 172. The register 172 forwards to the computer 180 the signals from the linear encoder reading head 160 of each carriage, and the signals from the measuring device 164 as the stem of a carriage moves through the line of sight of the measuring device. The computer 180 determines and records for each carriage the scale reading as the vertical center of the pillar post 152 (see FIGS. 7-9) of the carriages moves through the line of sight of the measuring device 164. In the present example under discussion, the difference or offset between the reading of the carriage 27 position and the carriage 26 position is minus 0.016 inch, and between the carriage 27 position and the carriage 25 is plus 0.005 inch.

The computer sends signals along the cables 182, 184, 184 to the stator 102 of the carriages 25-27, respectively to position the carriage 25 at the 65.995 inch position on the linear scale 162 as read by the linear encoder 160 of the carriage 25; the carriage 26 at the 95.016 inch position on the linear scale as read by the linear encoder of the carriage 26, and the carriage 27 at the 125.000 position on the linear scale as read by the linear encoder of the carriage 27.

After the carriages are in position, the servo motors 120 of the scoring wheel assemblies 30-32 of the carriages 25-27, respectively (see FIG. 4), are energized to move the scoring assemblies 30-32 from the storage position with the reference wheel and scoring wheel of each carriage spaced from the surface 156 of the glass ribbon 20, into the non-scoring position with the reference wheel 146 of the scoring assembly of each carriage riding on the surface 156 of the glass ribbon 20 and the scoring wheel 154 spaced from the surface 156 of the glass ribbon as shown in FIG. 8. At the designed time, the servomotor 120 of each of the scoring wheel assemblies of each carriage is energized to move the scoring assemblies 30-32 of the carriages 25-27, respectively into the scoring position with the scoring wheel 154 and the reference wheel 146 of the scoring wheel assemblies 30-32 contacting the surface 156 of the glass ribbon 20 as shown in FIG. 9. In the scoring position, a constant scoring load is imposed on the scoring wheel 154 of each scoring assembly as discussed above. After the scores 36-38 (see FIG. 2) of a desired length are imposed in the surface 156 of the glass ribbon 20, the servo motor 120 of each scoring assembly 30-31 is energized to move the scoring assemblies of each of the carriages to the non-scoring position (see FIG. 8) or to the storage position.

Downstream of the carriages 25-27 is a cross scoring bridge 220 having a scoring device 221, each shown in phantom in FIG. 2., to impose a cross score 222 shown in phantom through the score lines 36-38, e.g. from one end of the ribbon to the other edge. At a predetermined distance from the cross score 222, a second cross score (not shown) is imposed in the glass ribbon to define two sheets of glass having a width or length of 30 plus or minus 0.015 inches and a predetermined length or width, respectively. Downstream of the cross scoring equipment is a snapping station (not shown) as is well known in the art to open the slit and cross score lines to provide two pieces of glass having a width or length of 24 inches plus or minus 0.015 inch and a predetermined length or width, respectively.

The cross scoring technique and equipment discussed above is not limiting to the invention and any of the types used in the art can be used in the practice of the invention, e.g. but not limiting to the invention, the type disclosed in U.S. Pat. No. 3,797,339, which patent is hereby incorporated by reference.

As is appreciated the present invention is not limited to the number of carriages 25-27 mounted on the bridge 34, and the number of carriages should be sufficient to slit score the glass ribbon to provide glass pieces of all desired sizes. In a non-limiting embodiment of the invention, a conveyor having a width of 200 inches to accommodate a ribbon having a width of 180 inches can have three carriages every 25 inches of conveyor width, i.e. 24 carriages on the bridge. Further, the invention contemplates using one or more optical measuring devices 164 mounted on the bridge to position carriages on sections of the bridge 34.

While specific embodiments of the invention have been described in detail, it will be appreciated by those skilled in the art that various modifications and alternatives to those details can be developed in light of the overall teachings of the disclosure. Further, the presently preferred embodiments described herein are meant to be illustrative only and not limiting as to the scope of the invention which is to be given the full breadth of the appended claims and any and all equivalents thereof.

What is claimed is:

1. A system for positioning a pair of carriages in spaced relationship to one another, comprising:
    a first drive arrangement acting on a first carriage to move the first carriage along a first reciprocating path;
    a second drive arrangement acting on a second carriage to move the second carriage along a second reciprocating path;
    a first position measuring device for measuring positions of the first carriage along the first reciprocating path and for generating a first position signal indicating position of the first carriage on the first reciprocating path;
    a second position measuring device for measuring positions of the second carriage along the second reciprocating path and for generating a second position signal indicating position of the second carriage on the second reciprocating path;
    a motion detector positioned relative to the first and second reciprocating paths to generate a first reference signal as the first carriage moves past the detector and to generate a second reference signal as the second carriage moves past the detector; and
    electronics for
        receiving the first and second position signals and the first and second reference signals;
        acting on the first position signal and first reference signal to provide a first carriage reference position;
        acting on the second position signal and second reference signal to provide a second carriage reference position;
        comparing the second carriage reference position signal to the first carriage reference position to determine a difference there between defined as an offset, wherein the offset is selected from a plus value, a negative value or zero difference, and
        acting on the second drive arrangement to position the second carriage in a predetermined position on the second reciprocating path relative to the first carriage, wherein the predetermined position on the second reciprocating path is the position of the second carriage indicated by the second position signal plus the offset.

2. The positioning system according to claim 1, further comprising;
    a third carriage;
    a third drive arrangement acting on the third carriage to move the third carriage along a third reciprocating path;
    a third position measuring device for measuring positions of the third carriage along the third reciprocating path and for generating a third position signal indicating position of the third carriage on the third reciprocating path,
    the motion detector positioned relative to the first, second and third reciprocating paths to generate the first reference signal and the second reference signal and to generate a third reference signal as the third carriage moves past the detector; and
    the electronics comprises electronics for
        receiving the third position signal and the third reference signal;
        acting on the third position signal and third reference signal to provide a third carriage reference position;
        comparing the third carriage reference position to the first carriage reference position to determine a difference there between defined as a second offset, wherein the second offset is selected from a plus value, a negative value or zero difference; and
        acting on the third drive arrangement to position the third carriage in a predetermined position on the third reciprocating path relative to the first carriage, wherein the third predetermined position is the position of the third carriage indicated by the third position signal plus the second offset.

3. The positioning system according to claim 1, further comprising;
    a support surface for supporting an article;
    an elongated member having a first end and a second end, the member mounted over and in spaced relation to the surface, wherein the first and second reciprocating paths are between the ends of the elongated member;
    a track mounted on the elongated member with the first and second carriages mounted on the track, and
    a functional device mounted on each of the carriages to act on at least one surface of the article on the support surface.

4. The positioning system according to claim 3, further comprising a linear encoder scale mounted on the elongated member, wherein:
    the first drive arrangement comprises a linear stator mounted on the elongated member and a rotor mounted on the first carriage;

the second drive arrangement comprises the linear stator mounted on the elongated member and a rotor mounted on the second carriage;

the motion detector is an energy measuring device having a line of sight intersecting the first and second reciprocating paths;

the first position measuring device comprises a linear encoder reading head mounted on the first carriage capable of reading a linear encoder scale mounted on the elongated member; and the second position measuring device comprises a linear encoder reading head mounted on the second carriage capable of reading the linear encoder scale mounted on the elongated member.

5. The positioning system according to claim 3, wherein the motion detector is a device for measuring intensity of visible light, wherein the device for measuring intensity visible light is mounted on one side of the reciprocating paths.

6. The positioning device according to claim 5, further comprising a light source mounted on an opposite side of the reciprocating paths in spaced relationship to the device for measuring intensity of visible light, wherein the carriages individually moving past the device for measuring intensity of visible light causes portions of the light source to be blocked from the device for measuring intensity of visible light.

7. The positioning system according to claim 6, further comprising a linear encoder scale mounted on the elongated member, wherein:

the first drive arrangement comprises a linear stator mounted on the elongated member and a rotor mounted on the first carriage;

the second drive arrangement comprises the linear stator mounted on the elongated member and a rotor mounted on the second carriage;

the motion detector is an energy measuring device having a line of sight intersecting the first and second reciprocating paths;

the first position measuring device comprises a linear encoder reading head mounted on the first carriage capable of reading a linear encoder scale mounted on the elongated member; and the second position measuring device comprises a linear encoder reading head mounted on the second carriage capable of reading the linear encoder scale mounted on the elongated member.

8. The positioning system according to claim 7, further comprising;

a third carriage;

a third drive arrangement acting on the third carriage to move the third carriage along a third reciprocating path;

a third position measuring device for measuring positions of the third carriage along the third reciprocating path and for generating a third position signal indicating position of the third carriage on the third reciprocating path, the motion detector positioned relative to the first, second and third reciprocating paths to generate the first reference signal and the second reference signal and to generate a third reference signal as the third carriage moves past the detector; and the electronics comprises electronics for receiving the third position signal and the third reference signal;

acting on the third position signal and third reference signal to provide a third carriage reference position;

comparing the third carriage reference position to the first carriage reference position to determine a difference there between defined as a second offset, wherein the second offset is selected from a plus value, a negative value or zero difference; and acting on the third drive arrangement to position the third carriage in a predetermined position on the third reciprocating path relative to the first carriage, wherein the third predetermined position is the position of the third carriage indicated by the third position signal plus the second offset.

9. The positioning system according to claim 8, wherein at least one of the carriages comprises a plate member mounted on a track mounted on the elongated member and the article is a glass article selected from a glass sheet and a glass ribbon, and the functional device is a scoring device comprising:

a gearbox mounted on the at least one carriage, the gearbox having an axis rotatable in first direction toward the support surface and in a second direction away from the support surface;

an elongated arm member having one end connected to the axis of the gearbox and a second opposite end;

a scoring wheel mounted on the second opposite end of the elongated arm member; and a servomotor acting on the gearbox to rotate the axis of the gear box and the elongated arm member in a circular reciprocating path to move the scoring wheel toward the support surface into a scoring position and away from the support surface into a non-scoring position.

10. The positioning system according to claim 9, wherein the scoring device further comprises a housing pivotally mounted to the second end of the elongated arm member, a reference wheel mounted in the housing in spaced relation to the scoring wheel and a spring member mounted on the second end of the arm member and acting on the housing to biased the reference wheel toward the supporting surface.

11. The positioning system according to claim 3, wherein the functional device is selected from a scoring device, a cutting device, a marking device, a measuring device, a bar card reading device, a coating device, a recording device, a camera, and a projector.

12. The positioning system according to claim 3, wherein at least one of the carriages comprises a plate member mounted on a track mounted on the elongated member and the article is a glass article selected from a glass sheet and a glass ribbon, and the functional device is a scoring device comprising:

a gearbox mounted on the at least one carriage, the gearbox having an axis rotatable in first direction toward the support surface and in a second direction away from the support surface;

an elongated arm member having one end connected to the axis of the gearbox and a second opposite end;

a scoring wheel mounted on the second opposite end of the elongated arm member; and a servomotor acting on the gearbox to rotate the axis of the gear box and the elongated arm member in a circular reciprocating path to move the scoring wheel toward the support surface into a scoring position and away from the support surface into a non-scoring position.

13. The positioning system according to claim 12, wherein the scoring device further comprises a housing pivotally mounted to the second end of the elongated arm member, a reference wheel mounted in the housing in spaced relation to the scoring wheel and a spring member mounted on the second end of the arm member and acting on the housing to biased the reference wheel toward the supporting surface.

14. A method of positioning a pair of carriages in spaced relationship to one another on a bridge, comprising:
moving a first carriage from a first end of the bridge to a second opposite end of the bridge past a motion detector mounted at a predetermined position on the bridge between the ends of the bridge;
recording position of the first carriage as it moves past the motion detector to provide a first position reading;
moving a second carriage from the first end of the bridge to the second end of the bridge past the motion detector;
recording position of the second carriage as it moves past the motion detector to provide a second position reading;
comparing the second position reading to the first position reading and recording a difference, wherein the difference is an offset selected from a plus value, a minus value or zero difference;
moving the first carriage to a first working position on the bridge;
identifying a second working position on the bridge for the second carriage;
moving the second carriage toward it's the second working position and monitoring the position of the second carriage on the bridge as it moves toward the second working position, and
positioning the second carriage at the second working position, wherein the second working position of the second carriage is the measured position plus the offset.

15. The method according to claim 14, wherein after positioning the second carriage at the second working position, further comprising moving an article and the bridge relative to one another to act on at least one surface of the article.

16. The method according to claim 15, wherein the article is a glass article selected from a glass sheet and a glass ribbon, and the moving step is practiced by moving the glass article under the bridge past the first and second carriages.

17. The method according to claim 16, wherein each of the first and second carriages has a scoring carriage having a scoring wheel to impose a score in a surface of the glass article, and further comprising:
moving the scoring wheel under a scoring load in a first direction against the surface of the glass article, and
decreasing the load on the scoring wheel when the surface of the glass article moves the scoring wheel in a second opposite direction and increasing the scoring load when the surface of the glass article moves in the first direction.

18. The method according to claim 15, wherein the moving step is selected from imposing a score line in the surface of a glass sheet or ribbon; imposing a score line in the surface of a plastic sheet; cutting a plastic sheet; cutting a metal sheet; scoring a metal sheet; marking a sheet; measuring an article; reading a bar code; scanning an article surface coating a surface, photographing an article, and projecting a picture.

19. The method according to claim 14, wherein the motion detector senses light along a line of sight and the position recording of the motion detector comprises:
projecting a line of sight from the motion detector;
moving the carriages through the line of sight; and
generating a signal from the motion detector in response to changes in the amount of light sensed by the motion detector as each of the carriages moves through the line of sight to record the position of each carriage.

* * * * *